United States Patent
Abouimrane et al.

(10) Patent No.: US 9,054,373 B2
(45) Date of Patent: Jun. 9, 2015

(54) ANODE MATERIALS FOR LITHIUM ION BATTERIES

(75) Inventors: Ali Abouimrane, Naperville, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 737 days.

(21) Appl. No.: 13/235,138

(22) Filed: Sep. 16, 2011

(65) Prior Publication Data

US 2012/0080648 A1 Apr. 5, 2012

Related U.S. Application Data

(60) Provisional application No. 61/388,904, filed on Oct. 1, 2010.

(51) Int. Cl.
| | | |
|---|---|---|
| *H01B 1/00* | (2006.01) | |
| *C04B 35/00* | (2006.01) | |
| *H01M 4/36* | (2006.01) | |
| *H01M 4/48* | (2010.01) | |
| *H01M 4/58* | (2010.01) | |
| *H01M 4/13* | (2010.01) | |
| *H01M 4/139* | (2010.01) | |

(52) U.S. Cl.
CPC .............. *H01M 4/364* (2013.01); *H01M 4/13* (2013.01); *H01M 4/139* (2013.01); *H01M 4/483* (2013.01); *H01M 4/58* (2013.01)

(58) Field of Classification Search
USPC ............. 252/500; 501/92, 98.6, 269; 264/628
See application file for complete search history.

(56) References Cited

U.S. PATENT DOCUMENTS

| | | | |
|---|---|---|---|
| 2006/0014623 A1* | 1/2006 | Mikijelj | ............... 501/92 |
| 2006/0057463 A1 | 3/2006 | Gao et al. | |
| 2009/0075173 A1 | 3/2009 | Jeong et al. | |
| 2009/0317726 A1 | 12/2009 | Hirose et al. | |
| 2010/0009258 A1 | 1/2010 | Hasegawa et al. | |
| 2011/0160104 A1* | 6/2011 | Wu et al. | ............... 507/269 |

FOREIGN PATENT DOCUMENTS

KR 20070110569 11/2007

OTHER PUBLICATIONS

Todd et al., Tin-Transition Metal-Carbon Systems for Lithium-Ion Battery Negative Electrodes 2007, J. Electrochem. Soc. 154, 6, A597-604.*

"Battery Test Manual for Plug-in Hybrid Electric Vehicles"; Prepared for the U.S. Department of Energy: Idaho National Laboratory, Mar. 2008 (67 pages).

Amezawa, K. et al.; "Single-Electrode Peltier Heats of Li—Si Alloy Electrodes in LiCl—KCl Eutectic Melt" J. Electrochem, Soc., Jun. 1998, vol. 145, No. 6, pp. 1986-1993, The Electrochemical Society, Inc.

* cited by examiner

*Primary Examiner* — Monique Peets
(74) *Attorney, Agent, or Firm* — Foley & Lardner LLP

(57) ABSTRACT

A composite material has general Formula $(1-x)J-(x)Q$ wherein: J is a metal carbon alloy of formula $Sn_zSi_{z'}Met_wMet'_{w'}C_t$; Q is a metal oxide of formula $A_\gamma M_\alpha M'_{\alpha'}O_\beta$; A is Li, Na, or K; M, M', Met, and Met' are individually Ge, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd; $0<x<1$; $\gamma$ is 0, 1, or 2; $0<\alpha\leq1$; $0\leq\alpha'\leq1$; $\beta$ is 0.5, 1, 2, or 3; $0<t\leq5$; and the sum of z, z', w, and w' is greater than 0.

13 Claims, 7 Drawing Sheets

ANODE MATERIALS FOR LITHIUM ION BATTERIES

CROSS-REFERENCE TO RELATED APPLICATIONS

This application claims the benefit of U.S. Provisional Patent Application No. 61/388,904, filed on Oct. 1, 2010, the entire disclosure of which is incorporated herein by reference for any and all purposes.

GOVERNMENT INTERESTS

The United States Government has rights in this invention pursuant to Contract No. DE-AC02-06CH11357 between the United States Government and UChicago Argonne, LLC, representing Argonne National Laboratory.

FIELD

The present technology relates generally to electroactive materials.

BACKGROUND

The following description is provided to assist the understanding of the reader. None of the information provided or references cited is admitted to be prior art to the present invention.

Lithium-ion batteries for electric and hybrid vehicles (for example refer to: Battery Test Manual for Plug-in Hybrid Electric Vehicles; Prepared for the U.S. Department of Energy: Idaho National Laboratory, March 2008) require large electrode capacities and long durability. Development of new anode materials with higher capacity has been one focus of the research.

In lithium-ion secondary batteries, a carbon material such as non-graphitizable carbon or graphite, shows a relatively high capacity (372 mAhg$^{-1}$) and good cycle characteristics. However, the demand for higher energy density and other characteristics has led to further research in increasing the capacity of the anode beyond that of graphite.

Significant work has been carried out on non-carbon based anodes such as those based upon metal alloys, and intermetallics. In the case of metal alloys, the metal is electrochemically alloyed with lithium, and the resulting alloy is then susceptible to reversible lithium insertion and de-insertion in a battery environment. High capacity anodes using a SnCoC (tin-cobalt-carbon) alloy have been developed (for example, refer to U.S. Pat. No. 2009/0075173). However, Sn alloys (e.g. $Sn_3CO_3C_4$, where the 3, 3, and 4 represent molar ratios and in some examples may be expressed as $Sn_{30}CO_{30}C_{40}$) have a theoretically limited capacity of about 728 mAh/g, and a practical capacity of less than 400 mAh/g. In the SnCoC alloys, the tin and carbon are the active materials and the cobalt plays a role in buffering volume expansion of an electrochemical cell during the lithium insertion and de-insertion processes. In terms of capacity, the incorporation of a small amount of silicon, which has a theoretical maximum capacity of 4200 mAhg$^{-1}$ (refer to: K. Amezawa, N. Yamamoto, Y. Tomii and Y. Ito, J. Electrochem. Soc., 1998, 145, 2751), can increase the capacity, but the amount of silicon which may be added, is limited due the large volume expansion and the poor cycleability. Silicon oxides $SiO_x$, such as SiO, $SiO_2$, or carbon-coated $SiO_2$ are known to deliver a high capacity, but like silicon, these materials can crack easily due to volume changes during charging and discharging cycles. As a result, active material particles can be electronically isolated, thereby decreasing the battery capacity and cycle-life.

SUMMARY

It has now been found that metal composites of a metal oxide and a metal carbon alloy can buffer the volume expansion associated with lithium alloying of metal oxides. The metal composites minimize the poor conductivity effect of $Li_2O$ forming during the conversion reaction of the metal oxide with lithium. Good cycling performance is observed with the material prepared by the mixing of tin cobalt carbon alloys and a metal oxide material.

In one aspect, a composite material is provided having general Formula: $(1-x)J-(x)Q$; where J is a metal carbon alloy of formula $Sn_zSi_{z'}Met_wMet'_{w'}C_t$; Q is a metal oxide of formula $A_\gamma M_\alpha M'_{\alpha'} O_\beta$; where A is Li, Na, or K; M, M', Met, and Met' are individually Ge, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd; $0<x<1$; $\gamma$ is 0, 1, or 2; $0<\alpha\leq1$; $0\leq\alpha'\leq1$; $\beta$ is 0.5, 1, 2, or 3; $0<t\leq5$; and the sum of z, z', w, and w' is greater than 0. In some embodiments, z is from 1 to 5; z' is from 0 to 5; w is from 1 to 5; w' is from 0 to 5; and t is from 1 to 5. In some embodiments, x is from 0.2 to 0.6. In some embodiments, x is from 0.4 to 0.6. In some embodiments, x is from 0.45 to 0.55. In some embodiments, x is 0.5. In some embodiments, A is Li. In some embodiments, $\gamma$ is 0. In some embodiments, $\alpha$ is 0. In some embodiments, $\gamma$ is 0 and $\alpha'$ is 0. In some embodiments, Q is a metal oxide of formula $M_\alpha O_\beta$, wherein $\beta$ is 0.5, 1, 2, or 3; and M is Si, Ge, Sn, Cu, Ni, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd. In some embodiments, Q is a metal oxide of formula $M_\alpha O_\beta$, wherein $\alpha'$ is as above; $\beta$ is 0.5, 1, 2, or 3; and M is Si, Ge, Sn, or Mo. In some embodiments, J is a metal carbon alloy of formula $Sn_zMet_wC_t$; wherein z is from 1 to 5; M is Co; w is from 1 to 5; and t is from 1 to 5. In some embodiments, Q is a metal oxide of formula $M_\alpha O_\beta$, wherein $\beta$ is 0.5, 1, 2, or 3; and M is Si, Ge, Sn, Cu, Ni, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd; and J is a metal carbon alloy of formula $Sn_zMet_wC_t$; wherein z is from 1 to 5; Met is Co; w is from 1 to 5; and t is from 1 to 5. In some embodiments, Q is a metal oxide of formula $M_\alpha O_\beta$, wherein $\alpha$ is as above; $\beta$ is 0.5, 1, 2, or 3; and M is Si, Ge, Sn, or Mo; and J is a metal carbon alloy of formula $Sn_zMet_wC_t$; wherein z is from 1 to 5; Met is Co; w is from 1 to 5; and t is from 1 to 5. In some embodiments, Q is SiO, carbon-coated SiO, $SiO_2$, $GeO_2$, $SnO_2$, $MoO_3$, carbon-coated $SiO_2$, carbon-coated $GeO_2$, carbon-coated $SnO_2$, or carbon-coated $MoO_3$; and J is $Sn_3CO_3C_4$.

In another aspect, a process of preparing any of the composite materials above is provided. In some embodiments, at least part of the anode active material layer is formed by one or more methods such as vapor-phase deposition, spraying, firing, and liquid-phase deposition. In other embodiments, at least part of the anode active material layer is formed by method used in powder metallurgy, by molten methods utilizing an arc melting furnace, a high frequency induction heater or the like. In some embodiments, the molten material may be cooled and the cooled material may be pulverized. In some embodiments, the molten metal may be quickly cooled by methods such as single roll quenching, twin roll quenching, gas atomizing, water atomizing, centrifugal atomizing, or the like, to obtain a powder. In some embodiments, the molten material may be solidified by the single roll and/or twin roll quenching, and then the solidified material may be pulverized. Mechanical alloying and gas atomizing, may also be used according to other embodiments.

In another aspect, a process is provided for preparing any of the above composite materials. In some embodiments, at least part of the anode active material layer is formed by mechanical alloying or by gas atomizing.

In another aspect, an electrochemical device includes any of the above composite materials. In such embodiments, the electrochemical device may be a lithium secondary battery, lithium air battery, lithium sulfur battery, lithium selenium battery or lithium selenium-sulfur battery.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
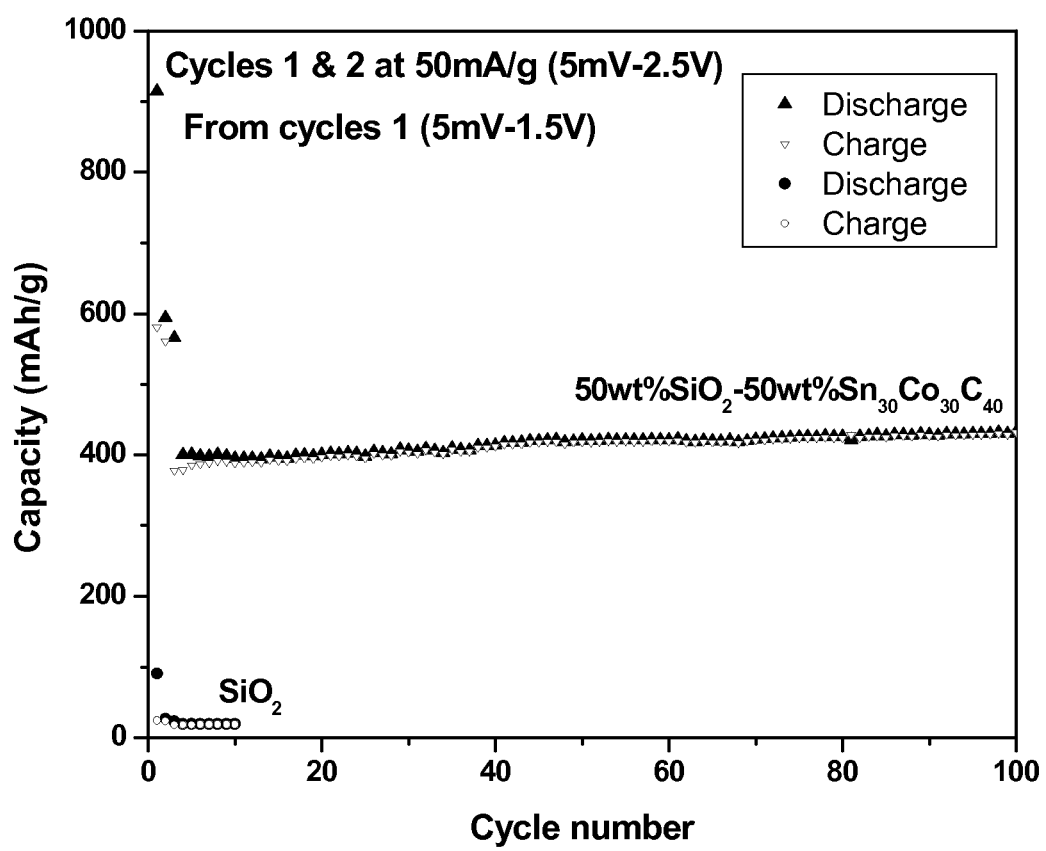
FIG. 1 illustrates graphs of charge and discharge capacities v. cycle number of Li|SiO$_2$ and Li|50 wt % SiO$_2$-50 wt % Sn$_{30}$CO$_{30}$C$_{40}$ half cells prepared using PVDF binder, according to the examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In one aspect, a composite material is provided. Such composite materials may be used as electrodes in electrochemical cells. For example, the composite materials may be used as anode materials. The composite material has general Formula (1-x)J-(x)Q. In the general formula, J is a metal carbon alloy of formula Sn$_z$Si$_{z'}$Met$_w$Met'$_{w'}$C$_t$. In the general formula, Q is a metal oxide of formula A$_\gamma$M$_\alpha$M'$_{\alpha'}$O$_\beta$. Accordingly, the composite has a formula of (1-x) Sn$_z$Si$_{z'}$Met$_w$Met'$_{w'}$C$_t$-(x) A$_\gamma$M$_\alpha$M'$_{\alpha'}$O$_\beta$. In the above formulas A is Li, Na, or K; M, M', Met, and Met' are individually Ge, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rh, Ru or Cd; 0<t≤5; 0<x<1; γ is 0, 1, or 2; 0<α≤1; 0≤α'≤1; β is 0.5, 1, 2, or 3; and there are no particular limitations on z, z', w, or w' other than that their sum is greater than 0. In some such embodiments, z is from 1 to 5; z' is from 0 to 5; w is from 0 to 5; w' is from 0 to 5; and t is from 1 to 5. As used herein, γ, α, α', β, t, z, z', w, and w' all represent molar ratios of the individual elements in the formula. Thus, they include ratios such as above for the SnCoC alloys where the ratios are on the order of Sn$_{30}$Co$_{30}$C$_{40}$. Other ratios are encompassed by the numbers as set forth. Thus, by way of illustration, Sn$_3$CO$_3$C$_4$ is representative of Sn$_{30}$Co$_{30}$C$_{40}$ or Sn$_{0.3}$Co$_{0.3}$C$_{0.4}$, and any other variation. According to various embodiments, x, and by corollary, 1-x, are ratios based upon weight between the components of the composite material, and x is from 0.2 to 0.6; from 0.4 to 0.6; or from 0.45 to 0.55. In other embodiments, x is 0.5.

The metal oxide, Q, has generally formula A$_\gamma$M$_\alpha$M'$_{\alpha'}$O$_\beta$. In the formula, A may be Li, Na, or K and γ is 0, 1, or 2. According to some embodiments, A is Li. However, in other embodiments of the composition, γ is 0 and therefore A is absent. In the formula M is present and α has a value of greater than 0 to less than or equal to 1. M' may be present, or absent, as defined by the value of α' which ranges from 0 to 1. In some embodiments, α is 0. In other embodiments, both γ and α are 0. Where both M and M' are present, the total of α and α' is 1. M and M' may individually be any of Ge, Mo, Al, Ga, As, Sb, Te, Ti, Si, Sn, Ta, Zr, Ca, Mg, Sr, Ba, Li, Na, K, V, Cr, Mn, Fe, Co, Ni, Cu, Zn, Nb, Rt, Ru or Cd, or M and M' may individually further be a combination of any two or more of these metals. In some embodiments, M and M' are Si, Ge, Sn, or Mo. The amount of oxygen in the metal oxide, on a molar basis, is 0.5, 1, 2, or 3 oxygen atoms per unit. Accordingly, in some embodiments, β is 0.5, 1, 2, or 3. In some embodiments, Q is a metal oxide of formula M$_\alpha$O$_\beta$, wherein β is 0.5, 1, 2, or 3; and M is Si, Ge, Sn, Cu, Ni, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd. In some embodiments, Q is a metal oxide of formula M$_\alpha$O$_\beta$, α is as above; β is 0.5, 1, 2, or 3; and M is Si, Ge, Sn, or Mo. In other embodiments, Q is SiO, carbon-coated SiO, SiO$_2$, GeO$_2$, SnO$_2$, or MoO$_3$. The metal oxide, Q, may be a mixture of metal oxides such that Q is actually a binary, tertiary, quaternary, or higher order mixture of metal oxides.

In any of the embodiments in the previous two paragraphs or the following paragraphs, β may be 0.5. In any of the embodiments in the previous two paragraphs or the following paragraphs, β may be 1. In any of the embodiments in the previous two paragraphs or the following paragraphs, β may be 2. In any of the embodiments in the previous two paragraphs or the following paragraphs, β may be 3.

The metal carbon alloy, J, has generally formula Sn$_z$Si$_{z'}$Met$_w$Met'$_{w'}$C$_t$. In the formula, Si and Met' may be present or absent, and values of z' and w' are as identified above. In the formula, Sn and Met are present, as evidenced by values of z and w that may range from greater than 0 to 5. In some embodiments, z and w range from 1 to 5, from 2 to 4, or from 3 to 4. In other embodiments, z' and w' are 0. The carbon is also required with values of t ranging from greater than 0 up to, and including, 5. Again, these values are based upon molar ratios of the elements, and, thus, the absolute value may be substantially larger, for example as a multiple of 5, 10, 20, or more. In various embodiments, Met and Met' are Ge, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd, or Met or Met' may individually further be a combination of any two or more of these metals. In some embodiments, Met and Met' are individually Co, Ni, or Mn. In some embodiments, z' and w' are 0, and Met is Co, Ni, or Mn. In other embodiments, z' and w' are 0, and Met is Co. In other embodiments, z is from 1 to 5; z' is 0, Met is Co; w is from 1 to 5; w' is 0; and t is from 1 to 5. In some embodiments, J is $Sn_3Co_3O_4$, e.g. $Sn_{30}Co_{30}O_{40}$. The metal carbon alloy, J, may be a mixture of metal carbon alloys such that J is actually a binary, tertiary, quaternary, or higher order mixture of metal carbon alloys.

In some embodiments of the composite material, Q is a metal oxide of formula $M_\alpha O_\beta$, wherein $\alpha$ is as above; $\beta$ is 0.5, 1, 2, or 3; and M is Si, Ge, Sn, or Mo; and J is a metal carbon alloy of formula $Sn_zMet_wC_t$; wherein z is from 1 to 5; Met is Co; w is from 1 to 5; and t is from 1 to 5. In some embodiments, Q is a metal oxide of formula $M_\alpha O_\beta$, wherein $\beta$ is 0.5, 1, 2, or 3; and M is Si, Ge, Sn, Cu, Ni, Mo, Al, Ga, As, Sb, Te, Ti, Ta, Zr, Ca, Mg, Sr, Ba, Li, Na, K, V, Cr, Mn, Fe, Co, Ni, Cu, Zn, Nb, Rt, Ru or Cd; and J is a metal carbon alloy of formula $Sn_zMet_wC_t$; wherein z is from 1 to 5; Met is Co; w is from 1 to 5; and t is from 1 to 5. In other embodiments, Q is SiO, carbon-coated SiO, $SiO_2$, $GeO_2$, $SnO_2$, or $MoO_3$; and J is $Sn_3CO_3C_4$ (aka $Sn_{30}CO_{30}C_{40}$). In any of the above embodiments, a may be as defined above, i.e. from 0 to 1, and in some embodiments, $\alpha$ is 1.

The composite materials described herein may be used in a wide variety of applications. One such application is as an anode active material for an electrochemical cell. Such electrochemical cells may be used in batteries such as lithium ion batteries. The materials may be used with electrolytes in the battery. Thus, in some embodiments, an anode includes any of the above composite materials. Such anode materials are illustrated below by the examples as improving the initial charge discharge efficiency and the cycle-life of a cell prepared with the composite materials as anodes. In other embodiments, a battery includes a cathode, and anode including any of the above composite materials, and an electrolyte. In some embodiments, the electrolyte is a non-aqueous electrolyte which includes an aprotic solvent and a metal salt.

Where a non-aqueous electrolyte is used, the electrolyte includes a polar aprotic solvent, and a lithium metal salt. The electrolytes are substantially non-aqueous. As used herein, substantially non-aqueous means that the electrolytes do not contain water, or if water is present, it is only present at trace levels. For example, where the water is present at trace levels it is present at less than 20 ppm.

A variety of solvents may be employed in the electrolyte as the polar aprotic solvent. Suitable polar aprotic solvents include liquids and gels capable of solubilizing sufficient quantities of the lithium salt and the redox shuttle so that a suitable quantity of charge can be transported from the positive electrode to negative electrode. The solvents can be used over a wide temperature range, e.g., from −30° C. to 70° C. without freezing or boiling, and are stable in the electrochemical range within which the cell electrodes and shuttle operate. Suitable solvents include dimethyl carbonate; ethyl methyl carbonate; diethyl carbonate; methyl propyl carbonate; ethyl propyl carbonate; dipropyl carbonate; bis(trifluoroethyl) carbonate; bis(pentafluoropropyl) carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; triglyme; dimethylvinylene carbonate; tetraethyleneglycol; dimethyl ether; polyethylene glycols; sulfones; and γ-butyrolactone.

Suitable lithium salts that may be used in the electrolytes, include, but are not limited to, $Li[B(C_2O_4)_2]$; $Li[BF_2(C_2O_4)]$; $LiClO_4$; $LiBF_4$; $LiAsF_6$; $LiSbF_6$; LiBr, $LiPF_6$; $Li[CF_3SO_3]$; $Li[N(CF_3SO_2)_2]$; $Li[C(CF_3SO_2)_3]$; $Li[B(C_6F_5)_4]$; $Li[B(C_6H_5)_4]$; $Li[N(SO_2CF_3)_2]$; $Li[N(SO_2CF_2CF_3)_2]$; $LiN(SO_2C_2F_5)_2$; $Li[BF_3C_2F_5]$; $Li[PF_3(CF_2CF_3)_3]$; $Li_2B_{12}F_{12-x}H_x$ ($0 \leq x \leq 1$) and lithium alkyl fluorophosphates.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}CO_yMet_zO_2$, $LiMn_{0.5}Ni_{0.5}O_2$, $LiMn_{0.3}CO_{0.3}Ni_{0.3}O_2$, $LiMn_2O_4$, $LiFeO_2$, $Li_{1+x}Ni_\alpha Mn_\beta CO_yMet'_\delta O_{2-z}F_z$, $A_nB_2(XO_4)_3$ (NASICON), vanadium oxide, lithium peroxide, sulfur, selenium, selenium sulfur, polysulfide, a lithium carbon monofluoride (also known as LiCFx), or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; where for the general cathode formulas $0 \leq x \leq 0.3$, $0 \leq y \leq 0.5$, $0 \leq z \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and where for the general cathode formulas $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

In another aspect, a method of preparing the above composite materials is provided. According to one embodiment, the material may be prepared by mixing the raw materials of the respective elements or composites in the appropriate stoichiometric amounts based upon the values of x, y, $\alpha$, $\beta$, $\gamma$, $\delta$, and/or $\sigma$. For example, such ratios may be $M_xM_y$ where ($0 < x+y$), $M_\alpha O_\beta$ where ($0 < \alpha+\beta$), or $Li_yM_\delta O_o$ where ($0 < \gamma+\delta+\sigma$). The mixture may then be processed by dissolving the mixture at elevated temperature in an electric furnace, in a high frequency induction furnace, or in an arc melting furnace, or the like, and then solidifying the resultant material that is formed. Each of these processing equipment items is well known. For example, an induction furnace is an electrical furnace in which the heat is applied by induction heating (electromagnetic induction), of a conductive medium (usually a metal) in a crucible placed in a water-cooled alternating current solenoid coil. Induction furnaces are clean, energy-efficient and provide well-controlled melting processes compared to most other means of metal melting. Electric arc furnaces heat charged materials by means of an electric arc formed by the electrical breakdown of a gas which produces an ongoing plasma discharge, resulting from a current flowing through normally non-conductive media such as air, using few graphite electrode.

In some embodiments, other methods of preparing the composite materials include melt spinning, atomizing such as with gas atomizing and water atomizing; rolling; or mechanochemical reaction, such as mechanical alloying method and mechanical milling. In some such embodiments, the mechanochemical reaction includes mixing the precursor materials in a planetary ball mill apparatus, or an attliter may be used as the mixing and grinding apparatus. As used herein, melt spinning is a technique used for rapid cooling of liquids that uses a wheel that is cooled internally, usually by water or liquid nitrogen, and rotated. A thin stream of liquid is then dripped onto the wheel and cooled, causing rapid solidification. As also used, gas atomization is a powder production technique accomplished by forcing a molten metal stream through an orifice at moderate pressures. A gas is introduced into the metal stream just before it leaves the nozzle, serving to create turbulence as the entrained gas expands (due to heating) and exits into a large collection volume exterior to the orifice. The collection volume is filled with gas to promote further turbulence of the molten metal jet. The water atomized particles are smaller, cleaner, and non-porous and have a greater breadth of size, which allows better compacting.

In some embodiments, other methods of preparing the composite materials include vapor-phase deposition, spraying, firing, and liquid-phase deposition methods.

In some embodiments, other methods of preparing the composite materials include powder metallurgy, by molten methods in an arc melting furnace, a high frequency induction heater or the like. In such methods, the molten material may be cooled and the cooled material may be pulverized. Further, the molten metal maybe quickly cooled by methods such as single roll quenching, twin roll quenching, gas atomizing, water atomizing, centrifugal atomizing, and the like to obtain powder. Further, the molten material may be solidified by single roll quenching and/or twin roll quenching, and then, the solidified material may be pulverized. In some embodiments, mechanical alloying is used. In other embodiments, gas atomizing is used.

In one embodiment, the composite material is prepared by high energy ball milling of the individual metal or metal oxide components. By way of illustration only, where the composite material 50 wt % $SiO_2$-50 wt % $Sn_{30}CO_{30}C_{40}$, the precursor components of $SiO_2$, Co metal, Sn metal, and graphite are mixed together with a high energy ball mixer. The resulting material is then suitable for use as an anode active material. According to various embodiments, the precursor materials may include metals (M), metal oxides, metal alloys, metal carbonates, metal acetates, or metal halides.

After preparation of the composite material, it may then be formed into an anode for use in an electrochemical cell, as noted above. The anode is prepared by mixing the composite material with a binder and applying the material to a current collector. For example, the composite material may be mixed in a solvent with the binder to form a slurry that is then applied to the current collector. Illustrative binders include, but are not limited to, poly(acrylonitrile) PAN, poly(vinylidene fluoride) (PVDF), polyvinyl alcohol (PVA), polyethylene, polystyrene, polyethylene oxide, polytetrafluoroethylene (Teflon), polyimide, styrene butadiene rubber (SBR), carboxy methyl cellulose (CMC), gelatine, a copolymer of any two or more such polymers, or a blend of any two or more such polymers. In some embodiments, the binder includes PVDF. In other embodiments, the binder includes polyimide. The solvent may be any suitable solvent to suspend the materials and solvate the binder. In one embodiment, the solvent is N-methylpyrrolidone (NMP).

The current collector provides contact between the electroactive (composite) material and an external load to allow for the flow of electrons through a circuit to which the electrode is connected. The current collector may be a conductive material. Illustrative current collectors include, but are not limited to, carbon paper, aluminum, nickel, platinum, palladium, gold, silver, copper, iron, stainless steel, rhodium, manganese, vanadium, titanium, tungsten, or aluminum carbon coated or any carbon-coated metal. In some embodiments, the current collector is carbon paper, aluminum or copper.

Accordingly, in some embodiments, a anode is provided that includes any of the composite materials produced above, a binder, and a current collector. In some embodiments, the binder includes poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatine, a copolymer of any two or more such polymers, or a blend of any two or more such polymers. In other embodiments, the current collector includes aluminum, nickel, platinum, palladium, gold, silver, copper, iron, stainless steel, rhodium, manganese, vanadium, titanium, tungsten, or carbon coated aluminum. In other embodiments, the current collector includes carbon paper, aluminum or copper.

In another aspect, a lithium battery is provided that includes the anode as prepared by any of the above processes.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

An anode laminate was prepared by mixing 80 wt % of Material A, 10 wt % acetylene black and 10 wt % PVDF, as a suspension in N-methylpyrrolidone (NMP). The NMP was then removed. Material A is 50 wt % $SiO_2$-50 wt % $Sn_{30}Co_{30}C_{40}$, which was prepared by high energy ball milling of $SiO_2$ (nano-material from Aldrich), Co and Sn metals (from Alpha Aesar), and graphite (from Hitachi).

The laminate material was then used to prepare 2325 coin cells using lithium metal foil as a counter electrode and an electrolyte of a 3:7 v/v mixture of ethylene carbonate and ethyl methyl carbonate, with lithium ions present in the form of $LiPF_6$ (1.2 M). As illustrated in FIG. 1, Material A delivers an initial capacity of 900 mAh/g at a current rate of 50 mA/g, and more than 417 mAh/g (47% of the initial capacity) at a 100 mA/g current rate. The latter value being sustained for more than 100 cycles. Good cycling performance was obtained and no capacity fade was observed after cycle number 4. In comparison, the $SiO_2$ nano-material alone, shows very poor electrochemical activity, and delivers an initial capacity of only 91 mAh/g at a current rate of 50 mA/g. This capacity decreases rapidly to less than 18 mAh/g after only 10 cycles, and at a current rate of 100 mA/g. Moreover, Material A has a tap density of about 1.43 g/cm$^3$, which is 7.5 times higher than that of the $SiO_2$ nano-material alone (only 0.19 g/cm$^3$).

Example 2

An anode laminate was prepared by mixing 80 wt % of Material B, 10 wt % acetylene black and 10 wt % PVDF, as a suspension in N-methylpyrrolidone (NMP). Material B is 50 wt % cSiO$_x$-50 wt % Sn$_{30}$CO$_{30}$C$_{40}$, which was prepared by high energy ball milling of cSiO$_x$ (carbon-coated SiO$_x$ from Shin Etsu), Co and Sn metals (from Alpha Aesar), and graphite (from Hitachi).

Figure 2:
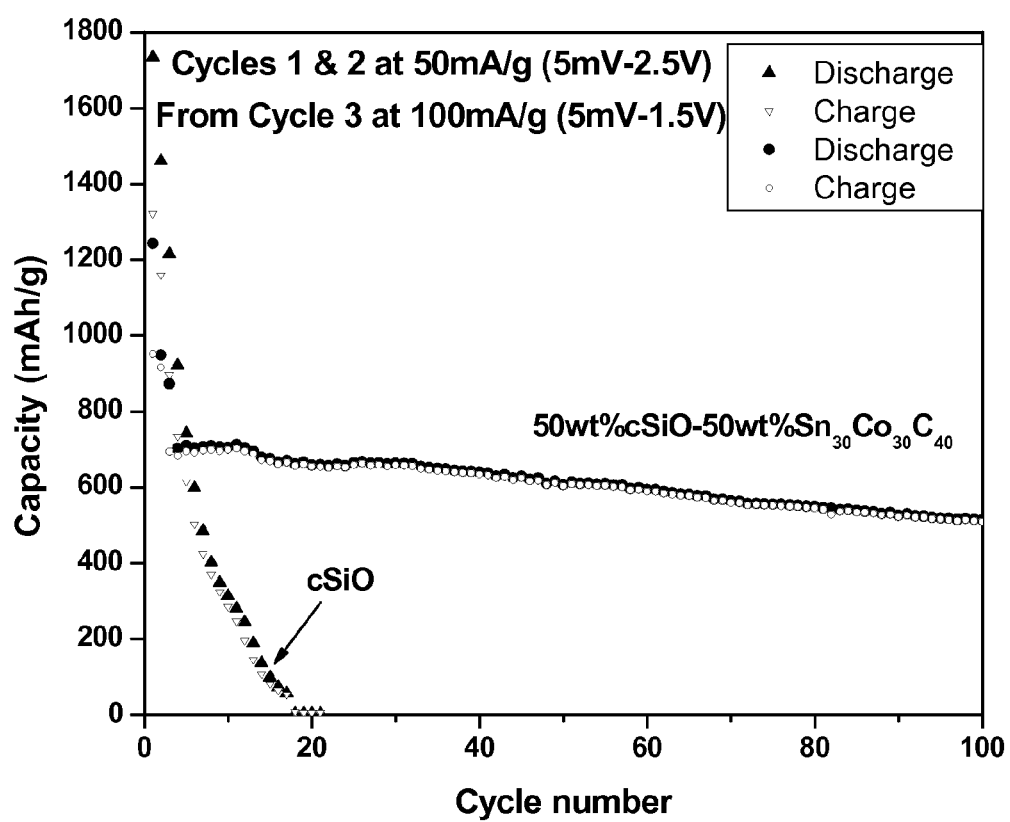
FIG. 2 illustrates graphs of charge and discharge capacities v. cycle number of Li|cSiO$_x$ and Li|50 wt % cSiO$_x$-50 wt % Sn$_{30}$CO$_{30}$C$_{40}$ half cells using PVDF binder, according to the examples.

The laminate material was then used to prepare 2325 coin cells, using a lithium metal foil as a counter electrode and an electrolyte of 3:7 v/v mixture of ethylene carbonate and ethyl methyl carbonate, with lithium ions present in the form of LiPF$_6$ (1.2 M). As illustrated in FIG. 2, Material B delivers an initial capacity of 1243 mAh/g at a current rate of 50 mA/g, and more than 497 mAh/g (47% of the initial capacity) at a 100 mA/g current rate. The latter value being sustained for more than 100 cycles. Moderately good cycling performance was obtained and a small capacity fade was observed after cycle number 4. In comparison, the cSiO$_x$ alone, delivers an initial capacity of 1734 mAh/g at a current rate of 50 mA/g. However, this capacity decreases rapidly to less than 6 mAh/g (approximately 0.34% of the initial value) after only 20 cycles, and at a current rate of 100 mA/g. Moreover, Material B has a tap density of about 1.81 g/cm$^3$, which is 2.4 times higher than that of the cSiO$_x$ nano-material alone (only 0.74 g/cm$^3$).

Example 3

Figure 3:
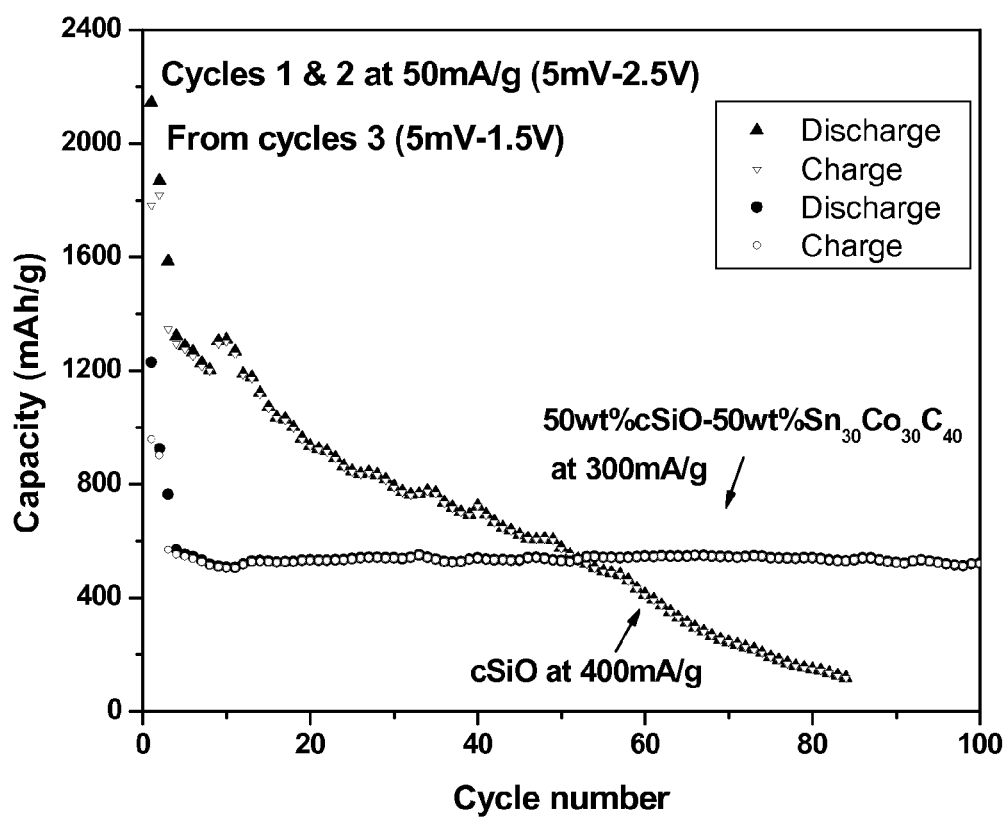
FIG. 3 illustrates graphs of charge and discharge capacities v. cycle number of Li|cSiO$_x$ and Li|50 wt % cSiO$_x$-50 wt % Sn$_{30}$CO$_{30}$C$_{40}$ half cells using polyimide binder, according to the examples.

An anode laminate was prepared by mixing 80 wt % of Material B, 10 wt % acetylene black and 10 wt % polyimide, as a suspension in N-methylpyrrolidone (NMP). The polyimide laminate material was then used to prepare 2325 coin cells, using a lithium metal foil as a counter electrode and an electrolyte of 3:7 v/v mixture of ethylene carbonate and ethyl methyl carbonate, with lithium ions present in the form of LiPF$_6$ (1.2 M). As illustrated in FIG. 3, Material B delivers an initial capacity of 1229 mAh/g at a current rate of 50 mA/g, and more than 519 mAh/g (42% of the initial capacity) at a 300 mA/g current rate. The latter value being sustained for more than 100 cycles. Good cycling performance was obtained and no capacity fade was observed after cycle number 4. In comparison, the cSiO$_x$ alone in polyimide, delivers an initial capacity of 2140 mAh/g at a current rate of 50 mA/g. However, this capacity decreases rapidly to less than 150 mAh/g (approximately 7% of the initial value) after only 80 cycles, and at a current rate of 400 mA/g.

Example 4

An anode laminate was prepared by mixing 80 wt % of Material C, 10 wt % acetylene black and 10 wt % polyimide, as a suspension in N-methylpyrrolidone (NMP). Material C is 50 wt % GeO$_2$-50 wt % Sn$_{30}$CO$_{30}$C$_{40}$, which was prepared by high energy ball milling of GeO$_2$ (Aldrich), Co and Sn metals (from Alpha Aesar), and graphite (from Hitachi).

Figure 4:
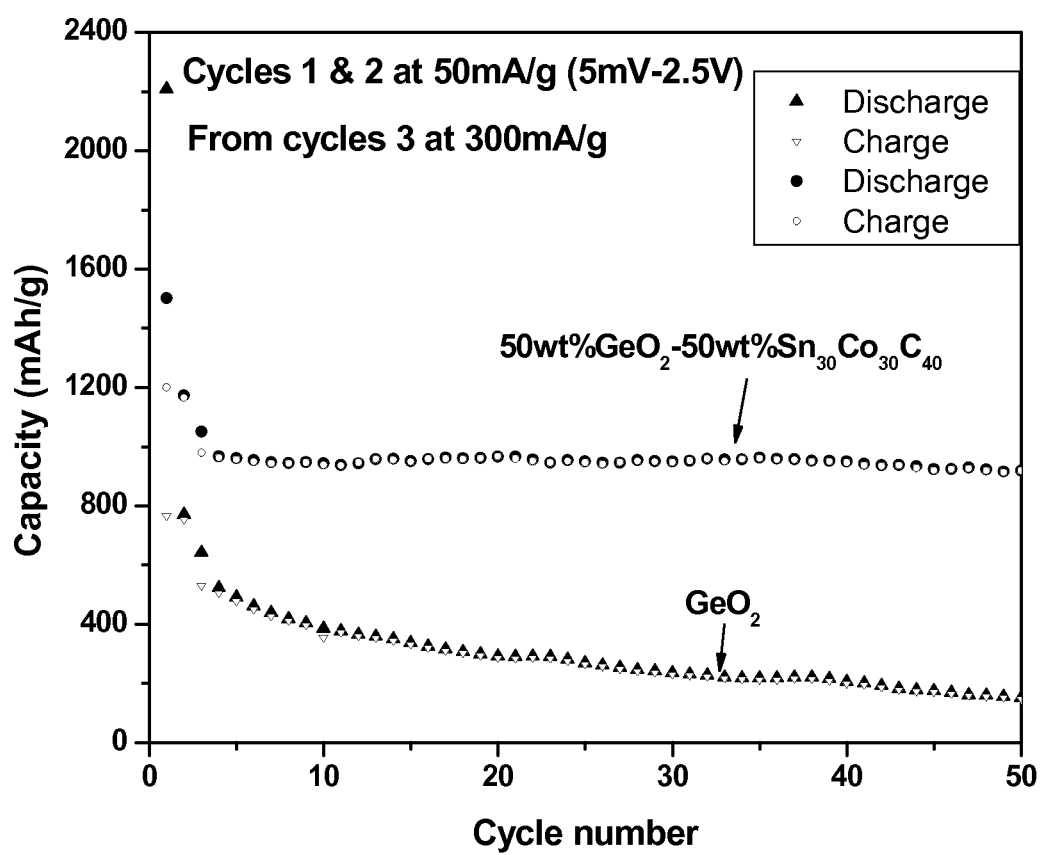
FIG. 4 illustrates graphs of charge and discharge capacities v. cycle number of Li|GeO$_2$ and Li|50 wt % GeO$_2$-50 wt % Sn$_{30}$CO$_{30}$C$_{40}$ half cells using polyimide binder, according to the examples.

The laminate material was then used to prepare 2325 coin cells, using a lithium metal foil as a counter electrode and an electrolyte of 3:7 v/v mixture of ethylene carbonate and ethyl methyl carbonate, with lithium ions present in the form of LiPF$_6$ (1.2 M). As illustrated in FIG. 4, Material C delivers an initial capacity of 1500 mAh/g at a current rate of 50 mA/g, and more than 918 mAh/g (61% of the initial capacity) at a 300 mA/g current rate. The latter value being sustained for more than 50 cycles. Good cycling performance was obtained and no capacity fade was observed after 4 cycles. In comparison, the GeO$_2$ alone in a similarly prepared cell, delivers an initial capacity of about 2209 mAh/g at a current rate of 50 mA/g. However, this capacity decreases rapidly to less than 151 mAh/g (approximately 7% of the initial value) after only 50 cycles, and at a current rate of 300 mA/g. Moreover, Material C has a tap density of about 2.62 g/cm$^3$, which is 34% higher than that of the GeO$_2$ alone (only 1.95 g/cm$^3$).

Example 5

An anode laminate was prepared by mixing 80 wt % of Material D, 10 wt % acetylene black and 10 wt % polyimide, as a suspension in N-methylpyrrolidone (NMP). Material D is 50 wt % SnO$_2$-50 wt % Sn$_{30}$CO$_{30}$C$_{40}$, which was prepared by high energy ball milling of SnO$_2$ (Aldrich), Co and Sn metals (from Alpha Aesar), and graphite (from Hitachi).

Figure 5:
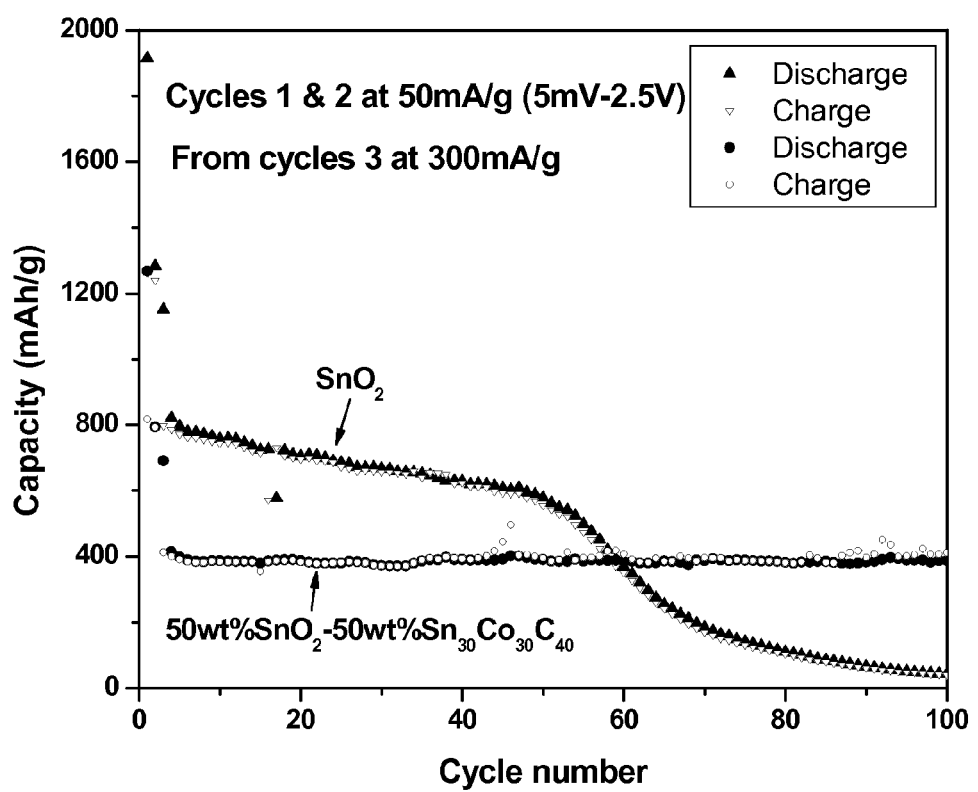
FIG. 5 illustrates graphs of charge and discharge capacities v. cycle number of Li|SnO$_2$ and Li|50 wt % SnO$_2$-50 wt % Sn$_{30}$CO$_{30}$C$_{40}$ half cells using polyimide binder, according to the examples.

The laminate material was then used to prepare 2325 coin cells, using a lithium metal foil as a counter electrode and an electrolyte of 3:7 v/v mixture of ethylene carbonate and ethyl methyl carbonate, with lithium ions present in the form of LiPF$_6$ (1.2 M). As illustrated in FIG. 5, Material D delivers an initial capacity of 1267 mAh/g at a current rate of 50 mA/g between 5 mV and 2.5V, and more than 819 mAh/g was reversible in the first cycle (with 65% charge-discharge coulombic efficiency). Good cycling performance was obtained at a current rate of 300 mA/g between 5 mV and 1.5 V and a capacity of 388 mAh/g was sustained for more than 100 cycles. In comparison, the SnO$_2$ alone in a similarly prepared cell, delivers an initial capacity of about 2010 mAh/g at a current rate of 50 mA/g. However, this capacity decreases rapidly to less than 43 mAh/g (approximately 2% of the initial value) after only 100 cycles, and at a current rate of 300 mA/g. Moreover, Material D has a tap density of about 3.02 g/cm$^3$, which is 8 times higher than that of the SnO$_2$ alone (only 0.37 g/cm$^3$).

Example 6

An anode laminate was prepared by mixing 80 wt % of Material E, 10 wt % acetylene black and 10 wt % polyimide, as a suspension in N-methylpyrrolidone (NMP). Material E is 50 wt % MoO$_3$-50 wt % Sn$_{30}$CO$_{30}$C$_{40}$, which was prepared by high energy ball milling of MoO$_3$ (Aldrich), Co and Sn metals (from Alpha Aesar), and graphite (from Hitachi).

Figure 6:
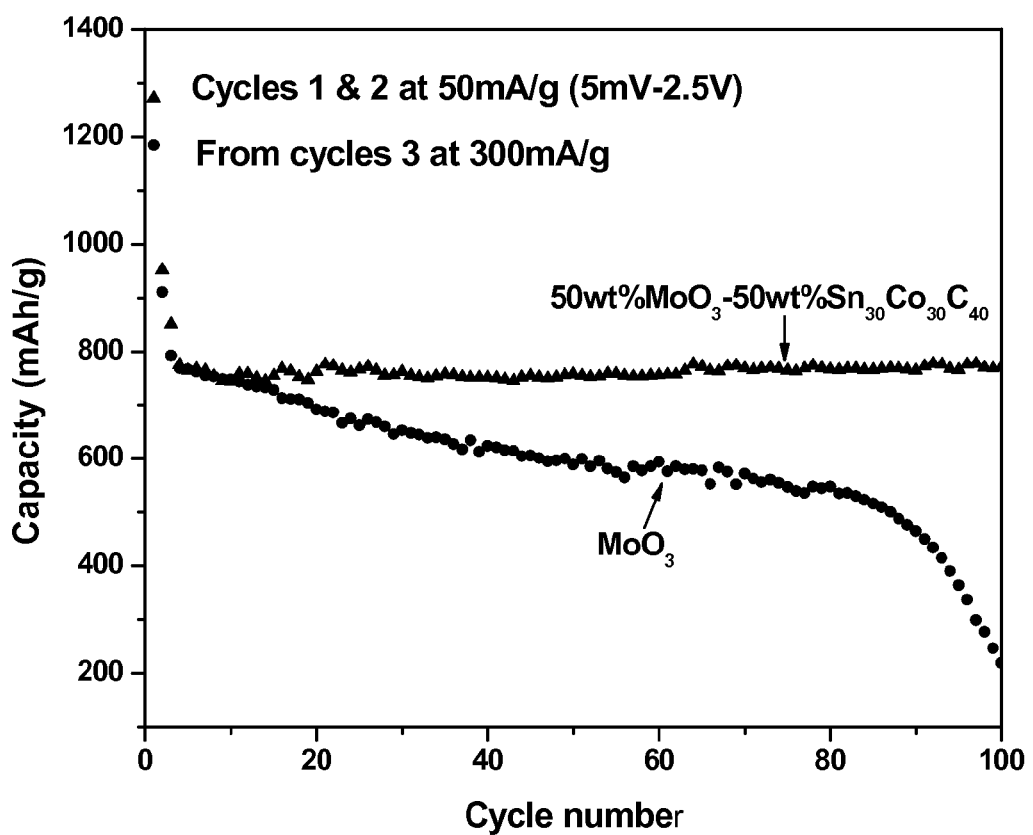
FIG. 6 illustrates graphs of charge and discharge capacities v. cycle number of Li|MoO$_3$ and Li|50 wt % MoO$_3$-50 wt % Sn$_{30}$CO$_{30}$C$_{40}$ half cells using polyimide binder, according to the examples.

The laminate material was then used to prepare 2325 coin cells, using a lithium metal foil as a counter electrode and an electrolyte of 3:7 v/v mixture of ethylene carbonate and ethyl methyl carbonate, with lithium ions present in the form of LiPF$_6$ (1.2 M). As illustrated in FIG. 6, Material E delivers an initial capacity of 1272 mAh/g at a current rate of 50 mA/g between 5 mV and 2.5V. Good cycling performance was obtained at a current rate of 300 mA/g and a capacity of 770 mAh/g was sustained for more than 100 cycles. In comparison, the MoO$_3$ alone in a similarly prepared cell, delivers an initial capacity of about 1184 mAh/g at a current rate of 50 mA/g. However, this capacity decreases rapidly to less than 219 mAh/g (approximately 19% of the initial value) after only 100 cycles, and at a current rate of 300 mA/g. Moreover, Material E has a tap density of about 2.74 g/cm$^3$, which is 66% higher than that of the MoO$_3$ alone (only 1.65 g/cm$^3$).

Example 7

An anode laminate was prepared by mixing 80 wt % of Material F, 10 wt % acetylene black and 10 wt % polyimide, as a suspension in N-methylpyrrolidone (NMP). Material F is 50 wt % SiO-50 wt % Sn$_{30}$CO$_{30}$C$_{40}$, which was prepared by high energy ball milling of MoO$_3$ (Aldrich), Co and Sn metals (from Alpha Aesar), and graphite (from Hitachi).

Figure 7:
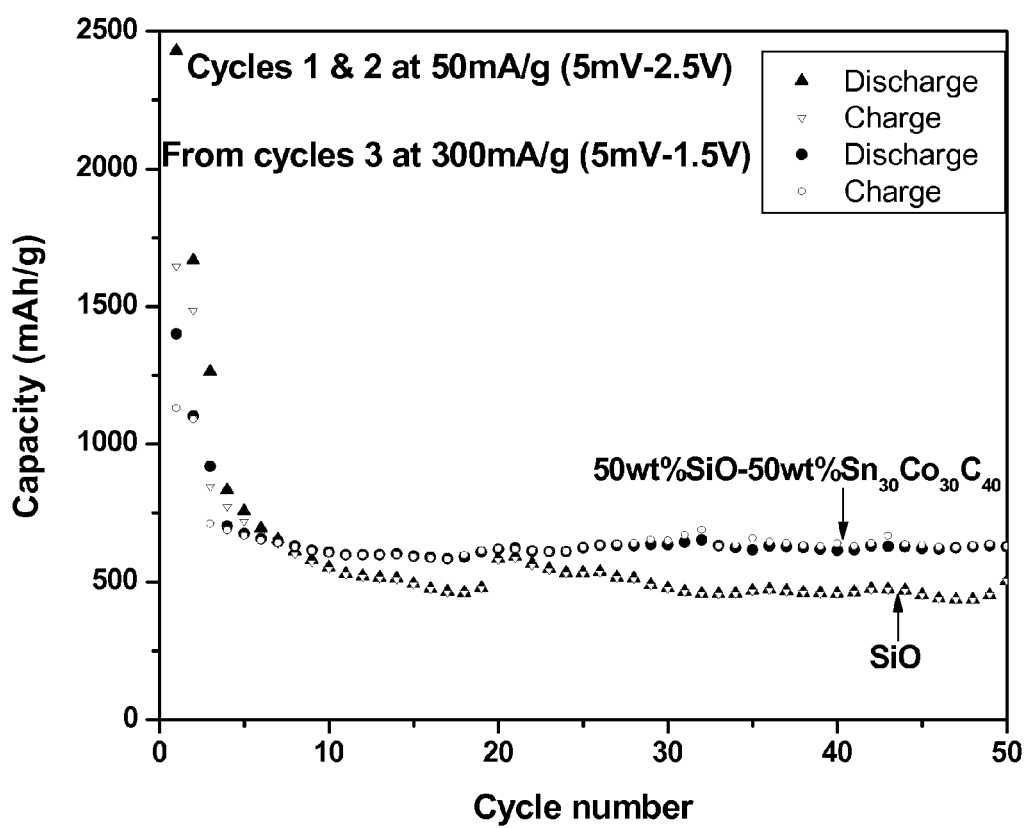
FIG. 7 illustrates graphs of charge and discharge capacities v. cycle number of Li|SiO and Li|50 wt % SiO-50 wt % Sn$_{30}$CO$_{30}$C$_{40}$ half cells using polyimide binder, according to the examples.

The laminate material was then used to prepare 2325 coin cells, using a lithium metal foil as a counter electrode and an electrolyte of 3:7 v/v mixture of ethylene carbonate and ethyl methyl carbonate, with lithium ions present in the form of $LiPF_6$ (1.2 M). As illustrated in FIG. 7, Material F delivers an initial capacity of 1400 mAh/g at a current rate of 50 mA/g, and more than 629 mAh/g (45% of initial capacity) at a current rate of 300 mA/g. This latter value was sustained for more than 50 cycles. Good cycling performance no capacity fade was observed after 8 cycles. In comparison, the SiO alone in a similarly prepared cell, delivers an initial capacity of about 2429 mAh/g at a current rate of 50 mA/g. However, this capacity decreases rapidly to less than 503 mAh/g (approximately 21% of the initial value) after only 50 cycles, and at a current rate of 300 mA/g. Moreover, Material F has a tap density of about 1.89 g/cm³, which is 78% higher than that of the SiO alone (only 1.06 g/cm³).

EQUIVALENTS

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A composite material of general Formula (1-x)J-(x)Q wherein:
    J is $Sn_zCo_wC_t$;
    Q is SiO, carbon-coated SiO, $SiO_2$, $GeO_2$, $SnO_2$, $MoO_3$, carbon-coated $SiO_2$, carbon-coated $GeO_2$, carbon-coated $SnO_2$, or carbon-coated $MoO_3$;
    wherein:
    $0<x<1$
    z is from 1 to 5;
    w is from 1 to 5; and
    t is from 1 to 5.

2. The composite material of claim 1, wherein x is from 0.2 to 0.6.

3. The composite material of claim 1, wherein x is from 0.4 to 0.6.

4. The composite material of claim 1, wherein x is from 0.45 to 0.55.

5. The composite material of claim 1, wherein x is 0.5.

6. The composite material of claim 1, wherein J is $Sn_3Co_3C_4$.

7. A process of preparing the composite material of claim 1, the process comprising forming at least a part of the composite material by vapor-phase deposition, spraying, firing, or liquid-phase deposition.

8. A process of preparing the composite material of claim 1, the process comprising forming at least a part of the composite material by a method used in a powder metallurgy, a molten method in an arc melting furnace, or a high frequency induction heater, the molten material may be cooled and the cooled material may be pulverized.

9. A process of preparing the composite material of claim 1, the process comprising forming at least a part of the composite material by a mechanical alloying method or by a gas atomizing method.

10. An electrochemical device comprising the composite material of claim 1.

11. The electrochemical device of claim 10 which is a lithium secondary battery, lithium air battery, lithium sulfur battery, lithium selenium battery, or lithium selenium-sulfur battery.

12. An anode active material comprising a composite material of general Formula (1-x)J-(x)Q wherein J is $Sn_zCo_wC_t$, Q is SiO, carbon-coated SiO, $SiO_2$, $GeO_2$, $SnO_2$, $MoO_3$, carbon-coated $SiO_2$, carbon-coated $GeO_2$, carbon-coated $SnO_2$, or carbon-coated $MoO_3$; and $0<x<1$, wherein z is from 1 to 5; w is from 1 to 5, and t is from 1 to 5.

13. An anode comprising the anode active material of claim 12, a binder, and a current collector.

* * * * *